J. W. MONAHAN.
MOTOR TRUCK HAVING A DUMPING BODY.
APPLICATION FILED OCT. 7, 1911.
1,112,024.
Patented Sept. 29, 1914.
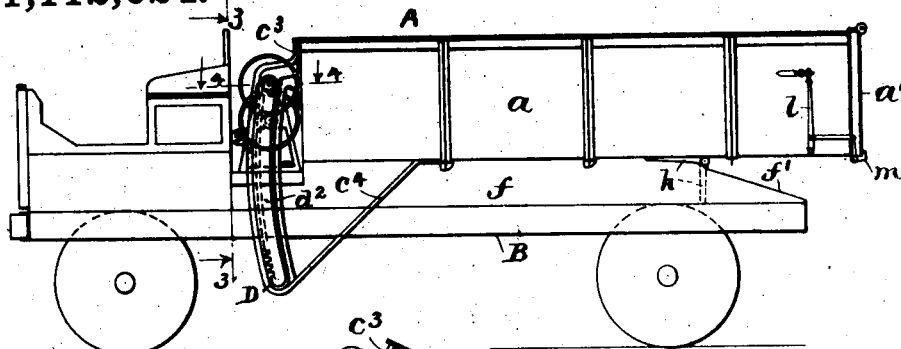
Fig. 1.
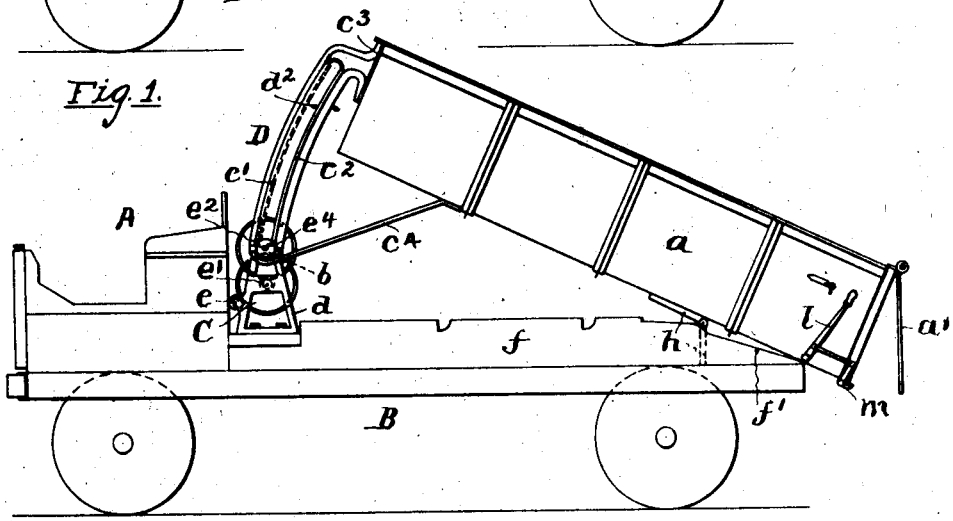
Fig. 2.
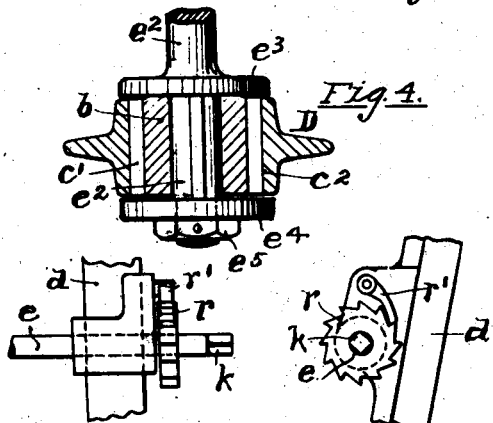
Fig. 4.
Fig. 5. Fig. 6.
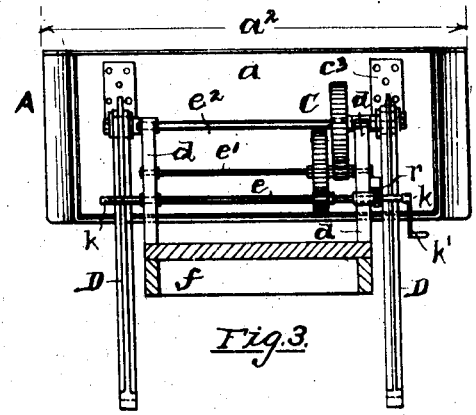
Fig. 3.
WITNESSES:
Herbert L. Kelley
H. M. Gustin
INVENTOR,
Joseph W. Monahan.
BY Geo. H. Remington
ATTORNEY.

UNITED STATES PATENT OFFICE.

JOSEPH W. MONAHAN, OF PROVIDENCE, RHODE ISLAND.

MOTOR-TRUCK HAVING A DUMPING-BODY.

1,112,024.  Specification of Letters Patent.  Patented Sept. 29, 1914.

Application filed October 7, 1911. Serial No. 653,356.

*To all whom it may concern:*

Be it known that I, JOSEPH W. MONAHAN, a citizen of the United States, residing at Providence, in the county of Providence and State of Rhode Island, have invented certain new and useful Improvements in Motor-Trucks Having Dumping-Bodies, of which the following is a specification.

My invention relates to improvements in self-propelled or motor-trucks having dumping bodies, and it consists in the novel construction, combination and arrangement of parts, all as more fully hereinafter set forth and claimed.

I am, of course, well aware that horse-drawn vehicles or trucks having dumping bodies have been devised and produced prior to my improved motor-truck; the latter, however, differs from said former constructions in that in adapting the bodies of motor-trucks to be tilted or swung up and down from the pivot point, the matters of power, ease and relative rapidity and facility of operation are to be considered. Moreover, the bodies of motor-trucks are as a rule capable of much greater capacity or load than animal-drawn wagon bodies. In other words, an operator of my improved motor-truck body is enabled to handle or swing the latter, including its load, with less effort or exercise of manual power than is usually expended in manipulating the tiltable body of a horse-drawn vehicle having less carrying capacity.

In the accompanying sheet of drawings illustrating my improvement, Figure 1 represents, in side elevation, the dumping body and the mechanism for operating it mounted on the frame and chassis of a motor-truck; the swinging body being in the lowered or normal position; Fig. 2 is a similar view showing the movable body part in the maximum elevated position; Fig. 3 is a transverse sectional view taken on line 3—3 of Fig. 1; Fig. 4 is a horizontal cross-sectional view, enlarged, of the main driving-pinion and its frame, taken on line 4—4 of Fig. 1; Fig. 5 is a side view of a ratchet device adapted to be employed in connection with the elevating or operating mechanism; and Fig. 6 is an end view of it.

It may be stated in advance that the motor-truck, except as to the present improvement hereinafter described, is or may be constructed substantially as usual. In other words, the engines or self-propelling means, the transmission device and chassis, indicated at B, and including the traction-wheels have no special form of construction over other motor-vehicles of this class; therefore the engines, transmission device, &c., are omitted from the drawings.

In the drawings A indicates a motor-truck as a whole, having a metal body part $a$ capable of being swung or tilted on its hinges or pivot $h$; one part being fast to the body $a$ and the other secured to the wooden frame $f$ mounted on the chassis B. The rear end portion $f^1$ of the frame is cut away to permit the tilting of the body and at the same time limiting its angular movement.

The mechanism for actuating the member $a$ and for controlling the latter's movements is located on the frame $f$ at a point immediately forward of the body $a$, the latter having, say a pair of laterally separated arc-shaped strong rack-arms D rigidly secured to its adjacent end. The hoisting mechanism proper, in coöperation with said arms D, consists of a pair of side frames or standards $d$—$d$ rigidly secured to the frame $f$, in which are revolubly mounted the parallel primary, intermediate and main shafts $c$, $c^1$ and $e^2$, respectively, carrying a suitable train of gearing C adapted, when in use, for transmitting the power or force applied to the crank $k^1$ of shaft $e$ to the upper or main shaft $e^2$, having pinions $b$ whose teeth are in continuous mesh with the rack-teeth $c^1$ of the respective arms D. The latter have each an elongated curved opening or slot $d^2$, its length corresponding with the extreme range of tilting movement of the body $a$. The upper end of the arm is constructed to form a foot $c^3$ adapted to be secured to the front end of the tilting body. These feet $c^3$ have enlarged flat rear faces to afford extended bearing surfaces against the front end of the vehicle body to which the feet are firmly secured. Its lower end is provided with an angularly disposed strut or brace $c^4$ secured to the underside of member $a$. Each of the said slotted and curved portions of the arms has its inner concave forward face provided throughout its length with rack-like teeth $c^1$ engaging the teeth of the small gear or pinion $b$, and having its rear inner convex face $c^2$ toothless or smooth, against which the outer face of the said pinion's teeth frictionally bears, thereby forming a guide or support. This pinion, as well as its mate, are secured to the respective outer ends of the main shaft $e^2$, the latter having an enlarged collar $e^3$ against which the inner end of the pinion is adapted to bear, its outer end being adapted to engage a similar collar $e^4$ secured to said shaft—see Fig. 4. If desired, the last-named collar may be held in place on the shaft by a nut $e^5$. The crank-shaft $e$ may also be provided with a small ratchet-tooth wheel $r$ and swinging pawl $r^1$, as indicated in Figs. 3, 5, and 6.

In order to facilitate the dumping of the load the sides of the tilting body $a$ may be flaring with respect to each other; that is, wider apart at the discharge end than at the front, as indicated at $a^2$, Fig. 3. The rear end may be closed by a swinging gate $a^1$ normally held in the closed position by bottom catches $m$, secured to a rod or shaft, adapted for angular movement by means of the manipulating lever 1. See Figs. 1 and 2.

Assuming now that a motor-truck A, embodying my improvement, is in the normal position wherein the tiltable load-carrying body $a$ is lowered or substantially level, as indicated in Fig. 1, the manner of elevating the body may be described as follows: A crank $k^1$ is first placed on the squared end $k$ of the primary-shaft $e$ and manipulated in the proper direction, thereby rotating the main shaft $e^2$ and its pinions $b$, mounted in and engaging the teeth $c^1$ of the concave side of the openings $d^2$ of the respective arms D, and causing the body $a$ to be swung upward on its pivot $h$ until arrested. See Fig. 2. While in this position, the lever $l$ may be swung from its locked or normal position to release the catches $m$, thereby permitting the tail gate to swing open, as indicated in Fig. 2. When the body $a$ is in the elevated or tilted position, and in fact, when in the intermediate and lowered positions, the relation of the pinions $b$ and collars $e^3$, $e^4$, to the slotted, rigidly mounted arms D are such as to form a guiding device, while at the same time acting to prevent the body $a$ from swaying or moving laterally. A reversal of the crank's movements operates to return the body to the lowered or normal position.

I claim as my invention:—

The combination with the chassis, frame and body of a motor truck, of elevating mechanism comprising a pair of curved longitudinally-slotted bars, each having rack teeth on the concave wall of its slot, and a plain bearing surface on the convex wall of its slot, and provided at its upper end with an integral rearwardly-projecting foot having an enlarged flat rear face to afford an extended bearing surface upon the front of said body to which it is secured, and at its lower end with an upwardly-inclined rigid strut, the rear end of which is secured to the underside of said body near its front end, a main shaft having its ends projecting through the slots in said bars, spaced collars on the ends of said main shaft, one on each side of said bars, pinions on said shaft between the collars, engaging the teeth on one side of the slots, and having a guiding bearing on the opposite sides of the slots, and gearing for revolving said shaft.

In testimony whereof I have affixed my signature in presence of two witnesses.

JOSEPH W. MONAHAN.

Witnesses:
 GEO. H. REMINGTON,
 JOS. H. MONAHAN.